Patented Apr. 15, 1952

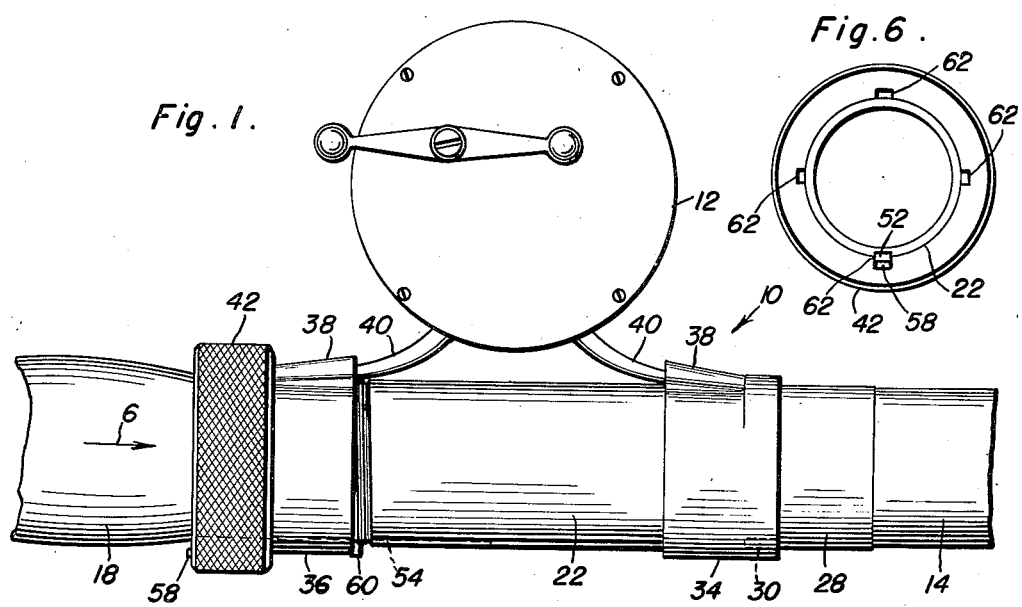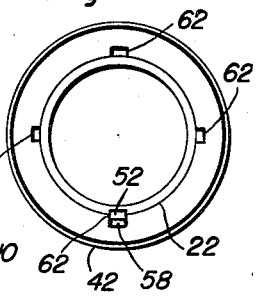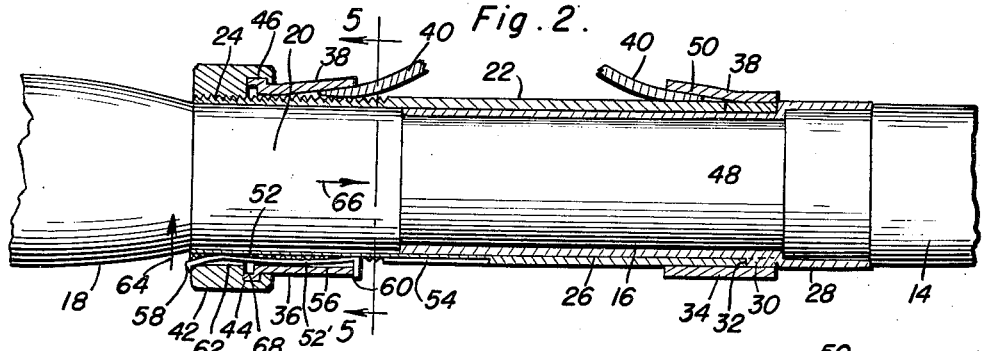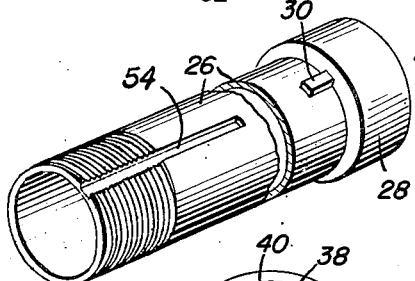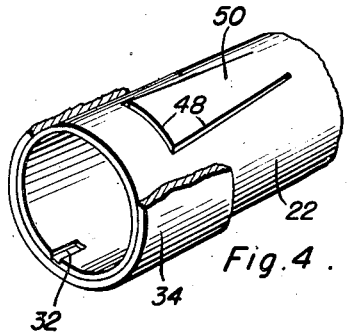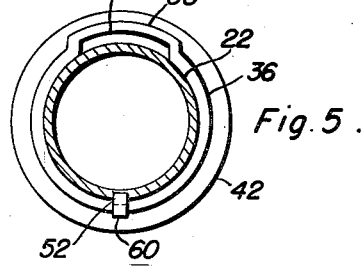
Ralph J. Esposito
INVENTOR.

2,592,878

UNITED STATES PATENT OFFICE 2,592,878

FISHING REEL SEAT

Ralph J. Esposito, New Orleans, La.

Application March 1, 1948, Serial No. 12,311

1 Claim. (Cl. 43—22)

This invention relates to new and useful improvements and structural refinements in seats for fishing reels, and the principal object of the invention is to firmly and securely retain the fishing reel in its seat on the fishing rod, yet at the same time, to facilitate a convenient separation of the reel from its seat, when so desired.

This object is achieved by providing a tubular seat member equipped with a stationary and a slidable ferrule, both these ferrules having pockets to receive the end portions of the fishing reel base, the tubular member also carrying a screw threaded collar which is operatively connected to the slidable ferrule and means also being provided for releasably locking the collar against rotation.

It will be apparent from the foregoing that by rotating the collar, when unlocked, the slidable ferrule may be slid toward or from the stationary ferrule, so as to facilitate the application or removal of the reel. Moreover, when the reel is applied to the seat and the ferrules are drawn together, separation of the reel from the seat will be prevented by simply locking the aforementioned collar.

An important feature of the invention lies in the provision of means on the reel seat for frictionally engaging the fishing rod, so that separation of the rod from the seat will be prevented as long as the fishing reel is locked in position.

Another feature of the invention resides in the provision of a fishing reel seat which is simple in construction, which may be quickly, easily and conveniently manipulated, and which will readily lend itself to economical manufacture.

With the above more important objects and features in view and such other objects and features as may become apparent as this specification proceeds, the invention consists essentially of the arrangement and construction of parts as illustrated in the accompanying drawings, in which:

Figure 1 is a side elevational view of the invention;

Figure 2 is a longitudinal sectional view thereof, the rod and handle portions being shown in elevation;

Figure 3 is a fragmentary perspective view of a sleeve used in the invention;

Figure 4 is a fragmentary perspective view of a tubular member used in the invention, the same being partially broken away;

Figure 5 is a cross sectional view, taken substantially in the plane of the line 5—5 in Figure 2, and Figure 6 is an end view, taken in the direction of the arrow 6 in Figure 1, with the handle of the fishing rod removed.

Like characters of reference are employed to designate like parts in the specification and throughout the several views.

Referring now to the accompanying drawings in detail, the invention consists of a fishing reel seat designated generally by the reference character 10, the same being intended for use for mounting a conventional reel 12 upon a fishing rod 14.

The fishing rod 14 in this instance assumes the form of the rod portion proper terminating at one end thereof in a cylindrical shank 16, and a handle portion 18 for the fishing rod similarly terminates at one end thereof in a further, cylindrical shank 20.

The seat 10 embodies in its construction a tubular body member 22 one end portion of which is externally screw threaded as at 24, while the remaining end portion of the member is plain and slidably receives therein a tubular sleeve 26. The shank portion 26 of the rod 14 is secured in the sleeve 26 and the latter may, if desired, be provided with an enlarged collar 28 for the purpose of governing the extent to which the sleeve may be inserted in the member 22.

Moreover, the sleeve 16 may be provided adjacent the collar 28 with an outwardly projecting dog 30 which is engageable with an elongated notch or recess 32 formed in the plain end portion of the member 22, whereby relative rotation of the rod 14 and the associated sleeve 26 with respect to the member 22 is prevented. It will be apparent from the foregoing that the reel seat member 22 performs a double function, namely, that of providing a seat for the fishing reel 12 as will be hereinafter more fully described, and secondly, that of separably connecting together the rod portion 14 and the handle 18. The shank portion 20 of the handle 18 is receivable in the screw threaded end portion of the member 22, as is best shown in Figure 2.

A stationary ferrule 34 is rigidly secured in any suitable manner to the plain end portion of the tubular member 22, while a similarly configurated ferrule 36 is slidably positioned on the screw threaded portion 24 of that member. The ferrules 34, 36 are provided with mutually aligned and opposing socket-forming portions 38, 38' to receive the end portions or arms 40 of the base of the reel 12, and an externally knurled, internally screw threaded collar 42 operatively engages the threaded portion 24 of the member 22, substantially as shown.

The collar 42 is provided with an internal annular groove 44 to rotatably receive an out-turned flange or lip 46 formed at one end of the slidable ferrule 36, and it will be apparent that by simply rotating the collar 42, the ferrule 36 will be caused to slide on the member 22 toward or away from the ferrule 34. Accordingly, the distance between the socket-forming portions 38, 38' may be varied so as to facilitate the application or removal of the reel seat arms 40, and it will be also apparent that when the reel has been applied to the seat as shown in Figure 1, it will not be possible to remove the reel until the collar 42 has been rotated and the ferrule 36 slid away from the ferrule 34. Therefore, by employing releasable locking means for preventing rotation of the collar 42, accidental or unintentional separation of the reel from its seat will be prevented. This locking means will be hereinafter fully detailed.

It is to be also noted that the plain end portion of the member 22 is formed with a substantially U-shaped slit 48, the base portion of which slit extends into the socket 38' of the stationary ferrule 34. It is to be noted that the socket-forming portions 38, 38' as provided by the ferrules 34, 36 have inclined wall surfaces, so that when the arms 40 of the reel are applied to the sockets and the ferrule 36 is forced toward the ferrule 34 by rotating the collar 42, the arm 40 disposed in the socket of the ferrule 34 will be urged against the portion 50 of the member 22 bordered at three sides by the U-shaped slit 48. This portion 50 may be referred to as a depressible, resilient tongue, and as the adjacent arm 40 of the reel is pressed against the tongue 50 the tongue will be caused to frictionally engage the outer surface of the sleeve 26 in the member 22, whereby unintentional separation of the sleeve from the seat member will be prevented as long as the reel is locked in position on the seat. Needless to say, by loosening the collar 42 and thereby relaxing the pressure of the tongue 50 on the sleeve 26, the rod portion 14 together with the associated sleeve may be withdrawn from the seat member 22.

The aforementioned locking means for preventing rotation of the collar 42 includes a resilient, depressible key 52 which is slidably positioned in a longitudinally extending keyway 54 formed in the screw threaded portion of the seat member 22. The key 52 has an arched intermediate portion 52' which slidably engages a longitudinally extending groove 56 formed in the ferrule 36 and the end portions of the key are outwardly angulated so as to provide a combined finger piece and detent 58 and a detent 60.

The aforementioned collar 42 is provided with a plurality of longitudinally extending grooves or slots 62 in which an end portion of the key 52 is selectively receivable, and as will be presently apparent, the key 52 performs a double function, namely, that of releasably locking the collar 42, and secondly, preventing rotation of the ferrule 36 on the seat member 22. The latter function of the key is, of course, effected by its engagement with the keyway 54 and with the groove 56, whereby the ferrule 36 is slidably but non-rotatably mounted on the seat member.

The primary function of the key 52, that is, its locking action on the collar 42, is accomplished by its engagement with any one of the grooves 62 in the collar, substantially as shown in Figure 2.

While in this position, the key 52 will prevent rotation of the collar with respect to the stationary ferrule 36 and the stationary seat member 22, but if it is desired to rotate the collar for the purpose of applying or removing the fishing reel, this is accomplished by simply depressing the detent 58 of the key into the keyway 54 in the direction of the arrow 64 and thereafter grasping the finger piece 60 and sliding the key 52 in the direction of the arrow 66 until the detent 58 slips into an annular recess 68 existing in the lip or flange 46 of the ferrule 36.

With the key 52 in that position, the collar 42 may be freely rotated, so as to cause sliding of the ferrule 36, together with the key 52, upon the seat member 22.

Needless to say, the collar 42 may be re-locked by simply pushing the finger piece 60 of the key 52 in the direction opposite to the arrow 66 so that the relatively opposite end portion of the key is engaged with one of the grooves 62 of the collar and the finger piece 58 is again projected outwardly from the collar, as shown in Figure 2.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a reel mounting, the combination of an elongated seat forming member having an externally screw-threaded portion provided with a longitudinal keyway, a reel engaging ferrule slidable on said member, said ferrule being provided with an internal longitudinal groove in register with said keyway and with an internal annular recess at one end of said groove, an actuating nut rotatable on the screw threaded portion of said member and rotatably connected to the end portion of said ferrule provided with said recess, said nut being provided with an internal longitudinally extending channel registrable with said groove and said keyway, and combined means for positively locking said ferrule against rotation and releasably locking said nut against rotation on said member, said means comprising an elongated resilient key slidable in said keyway and having an arched intermediate portion disposed in the groove of said ferrule, one end portion of said key constituting a depressible detent terminating in an outturned finger piece, and a second finger piece provided at the remaining end of the key, said detent being disposed in the channel of said nut to lock the latter against rotation but being depressible into said keyway and receivable in said recess upon sliding of said key to an unlocked position for facilitating rotation of said nut.

RALPH J. ESPOSITO.

REFERENCES CITED

The following references are of record in the file of this patent:

UNITED STATES PATENTS

| Number | Name | Date |
|---|---|---|
| 1,199,448 | Burnett | Sept. 26, 1916 |
| 2,120,467 | Howarth | June 14, 1938 |
| 2,409,940 | Kay | Oct. 22, 1946 |

FOREIGN PATENTS

| Number | Country | Date |
|---|---|---|
| 18,333 | Great Britain | of 1895 |